United States Patent [19]

Childs

[11] Patent Number: 4,554,612
[45] Date of Patent: Nov. 19, 1985

[54] AC METALLIZED FILM CAPACITOR

[75] Inventor: John J. Childs, Bennington, Vt.

[73] Assignee: Sprague Electric Company, North Adams, Mass.

[21] Appl. No.: 637,995

[22] Filed: Aug. 6, 1984

[51] Int. Cl.[4] .......................... H01G 1/14; H01G 9/00
[52] U.S. Cl. ..................................... 361/306; 361/433
[58] Field of Search ............... 206/328; 361/301, 306, 361/307, 331, 433

[56] References Cited

U.S. PATENT DOCUMENTS

| | | | |
|---|---|---|---|
| 2,549,770 | 4/1951 | Burnham | 361/316 |
| 2,647,224 | 7/1953 | Bruck | 361/398 |
| 2,751,665 | 6/1956 | De Roovere | 361/301 X |
| 3,204,164 | 8/1965 | Burke et al. | 361/301 |
| 3,236,936 | 2/1966 | Robinson | 361/307 X |
| 3,265,945 | 8/1966 | Jennings et al. | 361/301 |
| 3,283,225 | 11/1966 | Kalstein | 361/306 X |
| 4,313,084 | 1/1982 | Hosokawa et al. | 361/433 X |

Primary Examiner—Donald A. Griffin

[57] ABSTRACT

An AC wound metallized film capacitor which has a tab connected to each electrode utilizes a unitary spacer which encompasses the wound section isolating the section from a metal housing and the tabs from each other. The spacer is mainly rectangular in shape with a rectangular extension near the end of one long side and a cutout opposite the extension on the opposite long side. The spacer is wrapped around the capacitor section overlapping itself and extends beyond the top and bottom of the section. One tab, which is attached at the bottom of the section, passes between wound layers of the spacer and extends beyond the upper end of the section. The spacer extending beyond the bottom edge of the section is folded and sealed. The rectangular extension of the spacer isolates the bottom tab from the top of the section.

11 Claims, 6 Drawing Figures

AC METALLIZED FILM CAPACITOR

BACKGROUND OF THE INVENTION

This invention concerns an AC metallized film capacitor which has a unitary spacer which isolates the rolled capacitor section from a metal housing and the electrode tabs from each other and the housing. The spacer is mainly rectangular in shape and is wider than the section is tall. There is a rectangular extension near the end of one long side of the spacer and a cutout opposite it on the other side. The spacer is wrapped around the section and overlaps. A tab from the bottom of the section passes between the overlapped portion isolating it from the section and a housing. The edge of the spacer having a cutout is folded over the bottom of the section and sealed, and the extension or flap is folded over the top of the section.

Spacers which encompass a capacitor section and isolate it from a housing are well known. Such spacers may be in the form of a sleeve which is crimped at both ends, a pouch which also acts as a housing, or a multi-wrap arrangement. When a tab extends from the bottom of a unit along its side, the tab is frequently sleeved to isolate it from the section and the housing. These prior art spacers have been satisfactory but have not been adaptable to automated assembling.

SUMMARY OF THE INVENTION

This invention features an AC metallized film capacitor utilizing a unitary spacer which replaces multipiece wraps and sleeves. The spacer is mainly rectangular in shape and is wider than the capacitor section is tall so that it extends beyond the ends of the section when wrapped about it. It is also longer than the circumference of the section so that there is an overlap. The spacer has a rectangular extension or flap near the end of the long edges which eventually is folded over one end of the section. There is a cutout opposite the centerline of the flap on the other long edge for a tab from the other end of the section, the bottom, to pass between the overlapped portion of the spacer along the side of the section. The bottom edges of the spacer are pressed together and sealed. Alternately, they may be folded over and sealed to the end of the section.

The section can be wrapped using automated equipment with the tab passing between the first turns of the spacer through the cutout. The outer edge of the overlap may be sealed to the adjacent layer underneath if desired. The ends of the spacer with the cutout can be gathered and sealed after the wrapping of the spacer while the flap is folded over the top end of the section.

The tabs are ultimately connected to terminals located in a cover in a known manner after which the unit is inserted into a metal housing, and the cover is sealed to the housing. The section may be impregnated with a dielectric fluid if desired.

DESCRIPTION OF THE PREFERRED EMBODIMENTS

Figure 1:
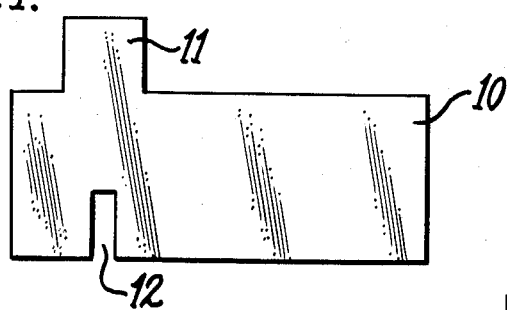
FIG. 1 shows an embodiment of the spacer of the present invention unrolled.
Figure 2:
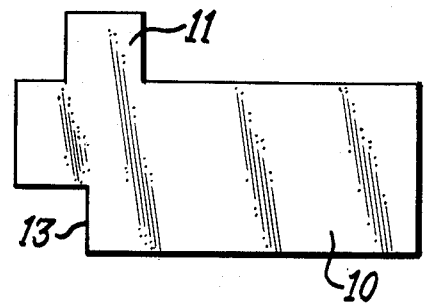
FIG. 2 shows a different embodiment of the spacer unrolled.

An AC metallized film capacitor which is to be encased in a metal housing has a unitary spacer which isolates the section and electrode tabs from the housing. As shown in FIGS. 1 and 2, spacer 10 is generally rectangular in shape with a rectangular extension or flap 11 near one end of a long side. Opposite the centerline of extension 11 on the other long side is a cutout 12 (FIG. 1) in the form of a slot or a rectangular cutout 13 (FIG. 2).

Figure 4:
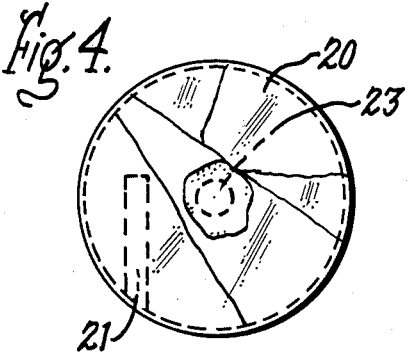
FIGS. 4 and 5 show two embodiments of the bottom seal.
Figure 5:
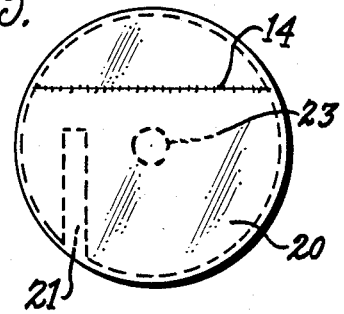

A capacitor section 20 is placed against the short edge of spacer 10 adjacent extension 11. A long electrode tab 21 (shown in FIG. 3) passes through slot 12 or cutout 13 behind spacer 10 which is then wrapped around the section 20 enclosing tab 21 in its layers. One edge of spacer 10 extends beyond the bottom of capacitor section 20 and is pressed together and sealed, preferably ultrasonically although a heat seal may be used. Seal 14 is shown in FIG. 5. Alternatively, these edges may be folded and sealed to the bottom of section 20 at core 23 as is shown in FIG. 4.

Figure 3:
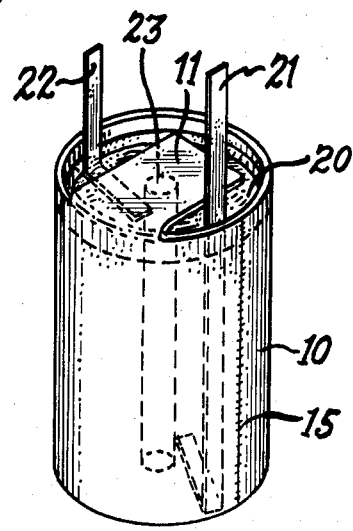
FIG. 3 shows the spacer assembled around the section.
Figure 6:
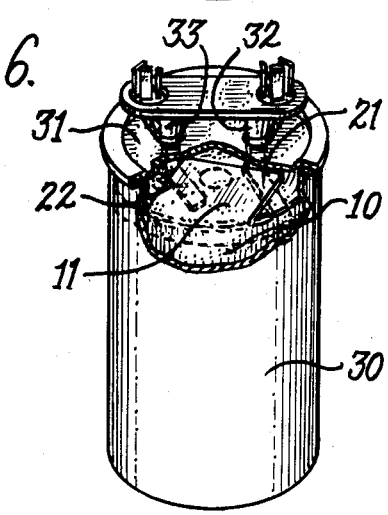
FIG. 6 is a cut-away view of the capacitor of this invention.

Extension 11 is folded over the top of section 20 as shown in FIG. 3. The edge of wrapped spacer 10 may be sealed to any underlying layer, if desired, or left free. The unit is finished as usual as shown in FIG. 6 by placing it in a metal housing 30 and connecting tabs 21 and 22 to terminals 32 and 33 respectively located in cover 31 and sealing the unit.

The spacer 10 may be made of a number of insulating plastics known in the capacitor industry but is preferably polypropylene for economic reasons. The one piece spacer 10 replaces at least four separate insulating pieces: a top piece a bottom piece, a sleeve for insulating electrode tab 21 from the unit and the housing, and a main body wrap. Not only does the present invention reduce the number of pieces in inventory, but the present spacer eliminates the step of separately sleeving an electrode tab.

The present spacer is also designed for automated assembling in that it can easily be automatically slipped between the section and the long tab and wrapped around the section. The bottom edge, and side edge if desired, can be sealed, the top is folded over, and the assembly inserted into a housing, also automatically and at greater speed than by hand.

What is claimed is:

1. A capacitor encased in a metal housing comprising a wound capacitor section having two electrodes each bearing a tab, one of said tabs extending from a bottom edge of said section along its height to above a top edge of said section, another of said tabs extending above said top edge, and a unitary spacer enclosing and insulating said section from said housing and insulating said tabs from each other, said section, and said housing, said spacer having a main body portion rectangular in shape having a rectangular extension on one long side of said body portion near an end thereof and a cutout portion on a long side of said body opposite said extension, said extension being folded over said top edge between said tabs insulating them from each other and said top edge.

2. A capacitor according to claim 1 wherein said cutout is a slit.

3. A capacitor according to claim 1 wherein said cutout is rectangular in shape.

4. A capacitor according to claim 1 wherein said spacer main body portion surrounds and overlaps the circumference of said section and extends beyond the height of said section.

5. A capacitor according to claim 4 wherein said one tab extends between layers of said overlap of said spacer along said height.

6. A capacitor according to claim 4 wherein a portion of said spacer main body portion is folded over said bottom edge of said section covering it and said one tab and insulating them from said housing.

7. A capacitor according to claim 6 wherein said spacer is sealed across said folded portion.

8. A capacitor according to claim 6 wherein said section is wound on a core and said folded portion is sealed to said core.

9. A capacitor according to claim 6 wherein said overlap is sealed to said main body portion along said height.

10. A capacitor according to claim 1 wherein said spacer is a plastic selected from the group consisting of heat-sealable and weldable plastics.

11. A capacitor according to claim 10 wherein said spacer is a polypropylene spacer.

* * * * *